United States Patent Office 3,258,440
Patented June 28, 1966

3,258,440
PREPARATION OF CIS-POLYBUTADIENE LATEX WITH SORBITANS, SORBIDES OR MONOOLEFIN-MALEIC ANHYDRIDE COPOLYMER
John E. Burleigh and Carl A. Uraneck, Bartlesville, Okla., assignors to Phillips Petroleum Company, a corporation of Delaware
No Drawing. Filed May 29, 1963, Ser. No. 283,985
13 Claims. (Cl. 260—23.7)

This invention relates to a process for preparing latexes of cis-polybutadiene.

During the last few years, a great deal of research has been conducted with the object of producing improved rubbery polymers. One of the products that has attracted widespread attention because of its superior properties is a polybutadiene containing a high percentage, e.g., at least 85 percent of cis 1,4-addition. This polymer is usually prepared by polymerizing 1,3-butadiene with a stereospecific catalyst in the presence of a hydrocarbon diluent. The cis-polybutadiene product is recovered from solution by steam stripping, alcohol coagulation or other suitable method. The rubbery product so obtained has been extensively used in the fabrication of automobile and truck tires and other articles for which conventional synthetic rubbers have heretofore been comparatively unsatisfactory. The applications for cis-polybutadiene would be greatly extended if they could be employed in the form of latexes. Latexes of synthetic elastomers have many uses, such as adhesive formulations, textile coatings, dipping materials, and the like. Up to the present time, however, no satisfactory process has been suggested for use in the preparation of a cis-polybutadiene latex.

It is an object of this invention, therefore, to provide a process for preparing a stable cis-polybutadiene latex.

Other and further objects and advantages of the invention will become apparent to those skilled in the art upon consideration of the accompanying disclosure.

The present invention is concerned with the production of a stable cis-polybutadiene latex. Broadly speaking, the process of this invention comprises the steps of treating a solution of a cis-polybutadiene in a hydrocarbon solvent with a salt of an organic acid and at least one dispersing agent selected from the group consisting of (1) a fatty acid ester of a compound selected from the group consisting of sorbitans and sorbides and (2) a salt of a copolymer of a monoolefin and maleic anhydride; adding water to the treated solution; and thereafter removing the hydrocarbon solvent. When proceeding in this manner, a stable latex is formed and only a small amount, if any, e,g., less than 5 percent, of the polymer precoagulates during removal of the hydrocarbon solvent. The results obtained were completely unexpected since around 20 percent of the polymer precoagulates when it is attempted to prepare a latex using only a salt of an organic acid as disclosed in U.S. Patent No. 2,568,950. Thus, utilization of the salt of an organic acid in conjunction with one or more of the dispersing agents has been found to be necessary in the production of a stable latex of cis-polybutadiene.

In carrying out the present process, the treating agents, i.e., the salt of an organic acid and the dispersing agent or agents, are thoroughly mixed with the polymer solution prior to the addition of any water. Thereafter, sufficient water is added to the mixture to obtain phase inversion. The polymer solution is vigorously agitated throughout the preparation of the emulsion, employing a high speed stirrer or a colloid-type mill. After addition of the water the hydrocarbon solvent is removed, preferably by stripping under vacuum, e.g., at a pressure ranging from 5 to 15 inches of mercury absolute. The water to hydrocarbon solvent weight ratio during the stripping operation should be at least 1:1 and can be as high as 8:1. A minimum 1:1 water to hydrocarbon solvent ratio is necessary in order to obtain a minimum of polymer precoagulation, and in some instances it may be necessary to add additional water in order to maintain this minimum ratio. At no time during the stripping operation should there be present less than 100 parts by weight of water per 100 parts by weight of polymer. The temperature used during the latex formation and during the subsequent stripping operation is generally in the range of 30 to 90° C., preferably from 38 to 70° C. In the stripping operation, the solvent is removed and the latex is concentrated to a solids content that is usually in the range of 10 to 50 weight percent. It is to be understood that during the stripping operation, some water may be removed in obtaining a latex having a desired solids content. In one embodiment of the invention, when the latex is concentrated to a solids content in the range of 10 to 30 weight percent, the latex is then allowed to stand for one or more hours, thereby forming a cream layer having a solids content up to about 50 weight percent, e.g., in the range of 30 to 50 weight percent. The cream layer so formed can be readily separated, e.g., by decantation, as the product of the process. If desired, the cream prior to use can be diluted with additional water in order to provide a latex having a specified solids content. It is often desirable to operate in this manner, i.e., by separating the cream layer and redispersing in water, since the soluble salts present remain in the polymer-lean liquid from which the polymer-rich cream layer is separated. This results in a reduction in the ash content of the final latex so that it has better color and aging properties.

The salt of an organic acid used in the present process is preferably formed in situ by adding to the polymer solution an alkali metal or ammonium hydroxide or an aliphatic or aromatic amine and a high molecular weight organic acid. However, it is to be understood that the salt of the organic acid can be prepared by reacting the aforementioned materials prior to their addition to the polymer solution. Among the high molecular weight organic acids that can be used are alkyl sulfonic acids containing from 10 to 18 carbon atoms per molecule, certain organic sulfuric acids, rosin acids, and saturated or unsaturated fatty acids containing from 10 to 18 carbon atoms per molecule. Examples of suitable fatty acids include lauric, myristic, palmitic, stearic, oleic, and the like. Any of the alkali metal hydroxides, such as sodium hydroxide and potassium hydroxide, can be employed. Examples of suitable amines include methylamine, dimethylamine, trimethylamine, ethylamine, diethylamine, triethylamine, n-propylamine, tri-n-propylamine, n-amylamine, n-hexylamine, laurylamine, ethylenediamine, trimethylenediamine, tetramethylenediamine, pentamethylene-diamine, hexamethylenediamine, ethanolamine, diethanolamine, allylamine, aniline, methylaniline, dimethylaniline, diethylaniline, o-toluidine, m-nitroaniline, 2,4-dinitroaniline, p-phenylenediamine, o-anisidine, p-phenetidine, m-chloroaniline, 2,4,6-trichloroaniline, 2,4,6-tribromoaniline, diphenylamine, triphenylamine and the like. The amount of high molecular weight organic acid added is usually in the range of 0.1 to 25, preferably from 1.0 to 15, parts by weight per 100 parts by weight of rubber (phr). It is usually preferred to add sufficient of the hydroxide or amine to obtain complete neutralization of the acid. However, it is within the scope of the invention to add an amount sufficient to obtain partial or over-neutralization of the organic acid, e.g., from 50 to 120 percent.

The fatty acid esters of sorbitans and sorbides used in the process can be represented by the following formulas:

(I) 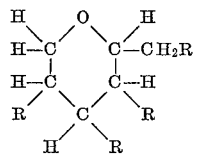

(II) 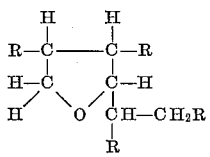

(III) 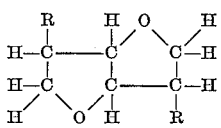

where R is selected from the group consisting of OH and

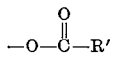

at least one of said R's being a

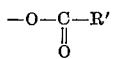

radical, and R' is a residue of a fatty acid, preferably a residue of a long chain fatty acid, saturated or unsaturated, containing from 5 to 25 carbon atoms. Examples of suitable fatty acid esters of sorbitans and sorbides include sorbitan monocaproate, sorbitan monocaprylate, sorbitan monocaprate, sorbitan tricaprate, sorbitan monolaurate, sorbitan trilaurate, sorbide monolaurate, sorbitan monomyristate, sorbitan tripalmitate, sorbitan monostearate, sorbide monostearate, sorbitan monolignocerate, sorbitan monopalmitoleate, sorbitan monooleate, sorbitan trioleate, sorbide monooleate, sorbitan monogadoleate, sorbitan monoacetoleate, sorbide monocerotate, and the like. The fatty acid esters are usually added in an amount in the range of 0.05 to 25, preferably from 0.1 to 15, parts by weight per 100 parts by weight of rubber.

As mentioned above, a salt of a copolymer of a monoolefin and maleic anhydride may be used as a dispersing agent in addition to or in place of the fatty acid ester of a sorbitan or a sorbide. The copolymers can be prepared by copolymerizing the anhydride, preferably in solution in an organic diluent such as benzene, with the olefin in the presence of a peroxide catalyst. Elevated temperatures and superatmospheric pressures are usually employed, and the monomers copolymerize in substantially equimolar proportions. It is usually preferred to employ a monoolefin having from 2 to 8 carbon atoms per molecule, such as ethylene, 1-butene, isobutylene, 1-pentene, 3-methyl-1-butene, 1-heptene, 2,4,4-trimethyl-1-pentene(diisobutylene), and the like. Salts of the copolymers are prepared by adding to the copolymer ammonium hydroxide or an alkali metal hydroxide, such as a sodium or potassium hydroxide. It is usually preferred to add the salt as such to the polymer solution. However, it is within the purview of the invention to form the salt in situ by separately adding the copolymer and the hydroxide. It is often preferred to employ in the practice of the present invention the sodium salt of a copolymer of diisobutylene and maleic anhydride. Such a product is sold by Rohm & Haas under the trademark Tamol 731 and by Alco Oil and Chemical Corporation under the trademark Trenamine W-25. Another very suitable dispersing agent is the sodium salt of a copolymer of ethylene and maleic anhydride. The salt of the copolymer of a monoolefin and maleic anhydride is usually used in a concentration of from 0.01 to 10, preferably from 0.05 to 5, parts by weight per 100 parts by weight of rubber.

The present invention is applicable to the preparation of latexes of cis-polybutadiene regardless of the method employed in preparing the polymer. The term "cis-polybutadiene" as used herein is intended to include a polybutadiene containing at least 85 percent cis 1,4-addition, e.g., from 85 to 98 percent and higher. The cis-polybutadiene can be prepared by polymerizing 1,3-butadiene with any one of a large number of different stereospecific catalyst systems. It is often preferred to employ a catalyst system which is formed by mixing materials comprising an organometal compound and iodine, either in the free or combined state. Examples of such catalyst systems include those formed by mixing a trialkylaluminum (1) titanium tetradiodide, (2) titanium tetrachloride and titanium tetraiodide or (3) a titanium chloride or bromide and elemental iodine. Specific examples of catalyst systems which can be used to polymerize 1,3-butadiene to a cis-polybutadiene include those formed by mixing the following materials: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; triisobutylaluminum, titanium tetrachloride and iodine; and triethylaluminum, titanium tetrabromide and iodine. Still other examples of catalyst systems formed by mixing materials comprising an organometal and an iodine-containing component are disclosed in copending U.S. application, Serial No. 229,223, filed by K. W. Rollman on October 8, 1962.

The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent. In preparing the cis-polybutadiene latexes it is usually preferred to treat the polymer solution as it is recovered from the polymerization process. However, it is also within the scope of the invention to dissolve previously recovered solid polymer in a hydrocarbon similar to those listed above.

The amount of the catalyst employed in polymerizing 1,3-butadiene to a cis-polybutadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst formed by mixing an organometal compound and more than one metal halide, e.g., titanium tetrachloride and titanium tetraiodide, the mol ratio of the tetrachloride to the iodide is usually in the range of 0.05:1 to 5:1. With a catalyst system formed by mixing an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is insert with respect to the polymerization reaction.

In another method for preparing cis-polybutadiene, 1,3-butadiene is polymerized with a catalyst formed by mixing a cobalt compound and a metal alkyl, wherein one but not all of the alkyl groups can be replaced by a halogen. Metal alkyls of the Group III metals, such as aluminum, are particularly useful in this system. Examples of suitable organometal compounds include the trialkylaluminums, such as triethylaluminum and triisobutylaluminum, and alkyl aluminum halides, such as ethylaluminum dichloride. Examples of cobalt compounds used in preparing the catalyst include cobaltous chloride, cobaltous sulfate, cobaltous nitrate, and the salts of organic acids, such as cobaltous acetate. In preparing cis-polybutadiene with a cobalt-type catalyst, it is particularly preferred to use a catalyst that is formed by mixing an alkyl aluminum dihalide and the reaction product of a cobaltous compound and ammonia or an amine, such as pyridine. The process which utilizes this latter catalyst system is described in detail in copending U.S. application, Serial No. 73,505, filed by R. P. Zelinski on December 5, 1960, now U.S. Patent No. 3,203,945.

A more comprehensive understanding of the invention can be obtained by referring to the following illustrative examples which are not intended, however, to be unduly limitative of the invention.

EXAMPLE I

A cis-polybutadiene latex was prepared, utilizing the recipe shown below. The cis-polybutadiene used in this and the succeeding examples was prepared by polymerizing 1,3-butadiene with a catalyst formed by mixing triisobutylaluminum, titanium tetrachloride and iodine. The polymer contained about 95 percent cis 1,4-addition.

*Recipe*

| | Parts by weight |
|---|---|
| Cis-polybutadiene solution | 850 |
| Toluene | 750 |
| Cis-polybutadiene | 100 |
| Sodium oleate | 9.7 |
| Sorbitan monooleate | 1.0 |
| Tamol–731 [1] | 0.3 |
| Water | 293 |

[1] Sodium salt of a copolymer of diisobutylene and maleic anhydride.

The procedure followed in preparing the latex was to charge the oleic acid and the sorbitan monooleate to the polymer solution contained in a high speed mixer. The resulting mixture was heated to between 50–65° C. The sodium hydroxide was then charged as a 1-molar aqueous solution so as to give a final pH of about 10.1, after which the Tamol–731 was added as a dilute aqueous solution (0.6 g. per 100 ml.). Thereafter, water to make a total of 293 parts was added, the amount used being sufficient to invert the phases to an oil-in-water emulsion. During the addition of the aforementioned materials to the polymer solution, the mixture was subjected to vigorous agitation. To 100 parts of the resulting emulsion there was added 236 parts by weight of water. The toluene was then stripped off at about 49° C. and at a pressure of about 5 inches of mercury absolute so as to give a latex containing 29 weight percent solids. A total of 3.9 weight percent of polymer precoagulated during the stripping operation. The latex was allowed to stand during which time it creamed to give a cream layer containing 48 percent solids.

EXAMPLE II

A control run was carried out in which it was attempted to prepare a cis-polybutadiene latex, using the following recipe:

*Recipe*

| | Parts by weight |
|---|---|
| Cis-polybutadiene solution | 848 |
| Toluene | 748 |
| Cis-polybutadiene | 100 |
| Sodium oleate | 9.7 |
| Water | 292 |

The procedure followed in the control run was essentially the same as that described in Example I except that the dispersing agents, namely, sorbitan monooleate and Tamol–731 were not added. The oleic acid was added to the polymer solution which was then heated to between 50–70° C. The sodium hydroxide was charged as a 1-molar aqueous solution so as to give a final pH of about 10.1. The water (292 parts) was then added, thereby giving an oil-in-water emulsion. The polymer was vigorously agitated during the addition of the various materials. There was then added to 100 parts of the resulting emulsion 57 parts of water. The toluene was then stripped off at about 49° C. at a pressure of about 5 inches of mercury absolute. As a result of the stripping operation, a latex containing 25 percent solids was obtained. A total of 20.2 percent polymer precoagulated during the stripping operation.

From the data shown in Examples I and II, it is seen that the presence of a dispersing agent is necessary in order to obtain a stable cis-polybutadiene latex. In the run in which a dispersing agent was not present, an excessive amount of the polymer precoagulated during the stripping operation.

EXAMPLE III

A run was made in the manner of Example I except that 245 rather than 236 parts of water was used in the stripping step. In the stripping operation, the latex was concentrated to a solids content of 13.8 weight percent. The latex was allowed to stand for 1 hour during which time it creamed to give a cream layer containing 34 weight percent solids. The cream layer was then redispersed by mixing after which the latex was concentrated to 27.4 weight percent by distillation. A total of 4.1 weight percent polymer precoagulated during the stripping and latex concentration steps.

A run is also carried out in which a cream layer containing about 34 weight percent solids is separated from the polymer-lean liquid. The separated cream layer is then redispersed in water so as to give a latex containing 30 percent solids. This operation results in the removal of soluble salts, thereby reducing the ash content of the final latex so that it possesses better color and aging properties.

EXAMPLE IV

A run was made in the manner of Example I except that 57 rather than 236 parts of water was used in the stripping step. The final latex contained 24.5 weight percent solids, and a total of only 2.1 weight percent polymer precoagulated during the stripping step.

EXAMPLE V

A run was made in the manner of Example I except that 9.7 phr. of sodium oleate was generated in situ and the sorbitan monooleate was omitted. Tamol–731 in the amount of 0.3 phr. was used. Two hundred ninety-two parts of water was used in the recipe, and 57 parts of water was employed in the stripping step. The final latex contained 26.8 percent solids, and a total of 2.9 weight percent polymer precoagulated during the stripping operation.

EXAMPLE VI

A run was made in the manner of Example V except that 0.5 rather than 0.3 phr. of Tamol–731 was used. The final latex contained 35.7 weight percent solids, and a total of 4.2 weight percent polymer precoagulated during the stripping step.

EXAMPLE VII

A run was made in the manner of Example I except that 9.7 phr. of sodium oleate was generated in situ and the Tamol–731 was omitted. In the recipe 2.0 parts of sorbitan monooleate and 292 parts of water were used, and 57 parts of water was employed in the stripping operation. The final latex contained 25.8 weight percent solids, and a total of 3.4 weight percent polymer precoagulated during the stripping step.

EXAMPLE VIII

A run was carried out in which a cis-polybutadiene latex was prepared using the following recipe:

*Recipe*

| | Parts by weight |
|---|---|
| Cis-polybutadiene solution | 844 |
| Cis-polybutadiene | 100 |
| Toluene | 744 |
| Oleic acid | [1] 9.0 |
| Sodium hydroxide | 1.73 |
| Dispersing agent [2] | 0.30 |
| Water | 294 |

[1] 9.7 sodium oleate.
[2] A copolymer of ethylene and maleic anhydride.

In this run, the oleic acid was initially mixed with the polymer solution. Thereafter, the dispersing agent, solubilized in an aqueous sodium hydroxide solution containing 0.65 g. of the agent and 3.75 grams of sodium hydroxide per 100 ml. of solution, was added. Water making a total of 294 parts was then charged, the amount added being sufficient to invert the water-in-oil emulsion. During the addition of the foregoing materials, the mixture was vigorously agitated. To 175 grams of the oil-in-water emulsion there was then added 50 ml. of water. The toluene was then stripped off at a pressure of 6 to 10 inches of mercury absolute at a temperature between 54 and 74° C. During the stripping operation, an additional 50 ml. of water was added. Stripping was continued until a final solids content of 24.9 weight percent was obtained. A total of 3.0 weight percent of polymer precoagulated during the stripping step.

EXAMPLE IX

A run was made in the manner of Example VII except that 2.0 parts by weight of sorbitan monooleate was also added to the polymer solution prior to addition of the sodium salt of the copolymer of ethylene and maleic anhydride. The final solids content of the latex was 25.1 weight percent. Of the solids present in the emulsion, 2.0 percent was lost as precoagulum.

EXAMPLE X

Another run was conducted in which a cis-polybutadiene latex was prepared, using the following recipe:

*Recipe*

| | Parts by weight |
|---|---|
| Cis-polybutadiene solution | 844 |
| Cis-polybutadiene | 100 |
| Toluene | 744 |
| Oleic acid | [1] 9.0 |
| Sorbitan monolaurate | 2.0 |
| Sodium hydroxide | 1.53 |
| Tamol–731 | 0.30 |
| Water | 291 |

[1] 9.7 sodium oleate.

In this run the oleic acid was mixed with the polymer solution after which the sorbitan monolaurate was added. The Tamol–731 was then charged as a solution of 0.6 gram per 100 ml. of water, followed by the aqueous sodium hydroxide solution containing 3.75 grams per 100 ml. of solution. Water, making a total of 291 parts, was then added, the amount being sufficient to invert the water-in-oil emulsion. The polymer solution was stirred vigorously during addition of the foregoing materials. To 175 grams of the oil-in-water emulsion there was added 50 ml. of water. The toluene was then stripped off at a temperature between 55 and 72° C. at a pressure of 4 to 10 inches of mercury absolute. An additional 50 ml. of water was added during the stripping operation. The latex was further concentrated by distillation to a final solids content of 26.2 weight percent. The polymer lost as precoagulum during the stripping and distillation steps amounted to 1.9 weight percent.

EXAMPLE XI

A run was made in the manner of Example X except that 2.0 phr. of sorbitan monostearate was used in place of the sorbitan monolaurate. The final latex contained 24.2 percent solids with the precoagulum amounting to 2.7 weight percent.

EXAMPLE XII

A run was made in the manner of Example X except that 2.0 phr. of sorbitan trioleate was used in place of sorbitan monolaurate. The final latex contained 22.0 weight percent solids. Polymer lost as precoagulum amounted to 2.8 weight percent.

EXAMPLE XIII

A control run was carried out in which the procedure of Example I was followed except that 11 phr. of Tamol–731 was employed. Neither sodium oleate nor sorbitan monooleate was used in the run. An oil-in-water emulsion was formed which separated into two phases on standing and could be dispersed on mixing. However, approximately 80 weight percent of the polymer was lost as precoagulum during the stripping operation.

Another control run was conducted in which 11 phr. of sorbitan monooleate was used. As in the foregoing control run, the procedure of Example I was followed but sodium oleate and Tamol–731 were not used. The water-in-oil emulsion which formed upon adding water to the polymer solution containing the added dispersing agent was unstable. The emulsion readily separated into two phase, one of which was a water-in-oil emulsion which would not invert on adding more water.

The foregoing results demonstrate that a satisfactory cis-polybutadiene latex can not be prepared by using the dispersing agents alone. It is necessary to use the dispersing agents in combination with a salt of organic acid as disclosed herein.

As seen from the foregoing examples, the present invention provides a process for preparing a stable cis-polybutadiene latex. The latexes of this invention are particularly desirable for use in the preparation of cis-polybutadiene-oil or cis-polybutadiene-oil-carbon black masterbatches. The latexes are also very useful in preparing mixtures with asphalt emulsions containing compatible anionic and/or non-ionic emulsifiers for use as roofing and siding materials, road bulding materials, and coating materials. The mixtures can also be used in soil stabilization.

As will be evident to those skilled in the art, many variations and modifications can be practiced in view of the foregoing disclosure. Such variations and modifications are believed to come within the spirit and scope of the invention.

We claim:

1. A process for producing a cis-polybutadiene latex which comprises mixing a solution of a cis-polybutadiene in a hydrocarbon solvent with (A) a salt of an organic acid and compound selected from the group consisting of an alkali metal hydroxide, ammonium hydroxide, an aliphatic amine and an aromatic amine, and (B) at least one dispersing agent selected from the group consisting of (1) a fatty acid ester of a compound selected from the group consisting of (I)
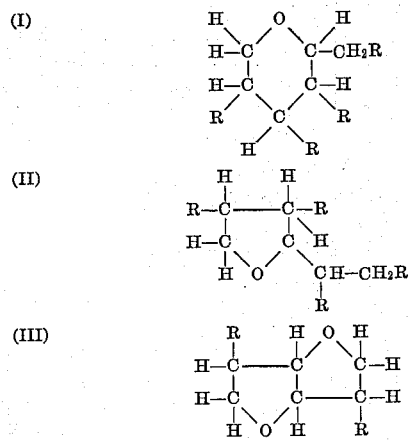

(II)

(III)

where R is selected from the group consisting of OH and

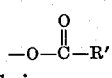

at least one of said R's being a

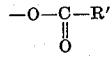

radical, and R' is a residue of a fatty acid, containing from 5 to 25 carbon atoms, and (2) a salt of a copolymer of a monoolefin and maleic anhydride; adding water to the resulting treated solution, and thereafter removing said hydrocarbon solvent.

2. A process for producing a cis-polybutadiene latex which comprises mixing in a mixing zone a solution of a cis-polybutadiene in a hydrocarbon solvent with (A) a salt of an organic acid and a compound selected from the group consisting of an alkali metal hydroxide, ammonium hydroxide, an aliphatic amine and an aromatic amine, and (B) at least one dispersing agent selected from the group consisting of (1) a fatty acid ester of a compound selected from the group consisting of (I)
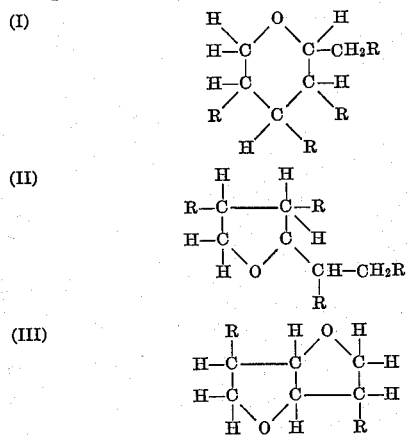

(II)

(III)

where R is selected from the group consisting of OH and

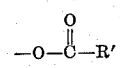

at least one of said R's being a

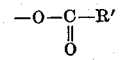

radical, and R' is a residue of a fatty acid, containing from 5 to 25 carbon atoms, and (2) a salt of a copolymer of a monoolefin and maleic anhydride; adding water to said mixing zone, the amount of water present being at least 100 parts by weight per 100 parts by weight of said cis-polybutadiene; stripping off said hydrocarbon solvent; and recovering a latex of cis-polybutadiene.

3. The process of claim 2 in which the ratio of water to hydrocarbon solvent during said stripping is in the range of 1:1 to 8:1.

4. The process of claim 2 in which said salt of an organic acid is prepared in situ by adding to said mixing zone an organic acid and a compound selected from the group consisting of an alkali metal hydroxide, ammonium hydroxide, an aliphatic amine and an aromatic amine.

5. The process of claim 4 in which said organic acid is a fatty acid containing from 10 to 18 carbon atoms per molecule.

6. The process of claim 2 in which the amount of said organic acid is in the range of 0.1 to 25 parts by weight, the amount of said fatty acid ester is in the range of 0.05 to 25 parts by weight, and the amount of said salt of a copolymer is in the range of 0.01 to 10 parts by weight, all based on 100 parts by weight of cis-polybutadiene.

7. The process according to claim 2 in which oleic acid, sodium hydroxide, sorbitan monooleate, and the sodium salt of a copolymer of diisobutylene and maleic anhydride are added to said mixing zone.

8. The process according to claim 2 in which oleic acid, sodium hydroxide and the sodium salt of a copolymer of diisobutylene and maleic anhydride are added to said mixing zone.

9. The process according to claim 2 in which oleic acid sodium hydroxide and sorbitan monooleate are added to said mixing zone.

10. The process according to claim 2 in which oleic acid, sodium hydroxide and the sodium salt of a copolymer of ethylene and maleic anhydride are added to said mixing zone.

11. The process according to claim 2 in which oleic acid, sodium hydroxide and sorbitan monostearate are are added to said mixing zone.

12. A process for producing a latex of cis-polybutadiene which comprises mixing in a mixing zone (A) a salt of an organic acid and a compound selected from the group consisting of an alkali metal hydroxide, ammonium hydroxide, an aliphatic amine and an aromatic amine, (B) at least one dispersing agent selected from the group consisting of (1) a fatty acid ester of a compound selected from the group consisting of (I)
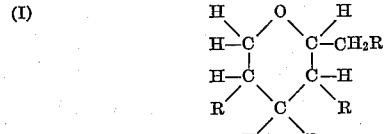

(II)
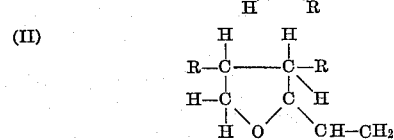

(III)
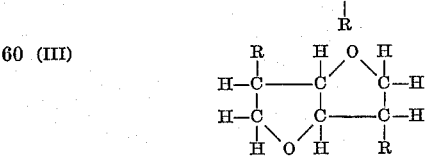

where R is selected from the group consisting of OH and

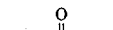

at least one of said R's being a

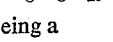

radical, and R' is a residue of fatty acid, containing from 5 to 25 carbon atoms, and (2) a salt of a copolymer of a monoolefin and maleic anhydride, and (C) a solution of a cis-polybutadiene in a hydrocarbon solvent; thoroughly mixing the materials in said mixing zone; adding to said mixing zone while continuing to mix the materials in said mixing zone; removing said hydrocarbon solvent by stripping under a vacuum of from 5 to 15 inches of mercury absolute, the temperature during said mixing and stripping operations being in the range of 30 to 90° C., the amount of water present during said stripping being at least 100 parts by weight per 100 parts by weight of said cis-polybutadiene and the water for hydrocarbon solvent ratio during said stripping being at least 1:1; and recovering a latex of cis-polybutadiene having a solids content in the range of 20 to 50 weight percent.

13. The process according to claim 12 in which said latex has a solids content in the range of 10 to 30 weight percent; said latex is allowed to stand so as to form a cream layer having a solids content in the range of 30 to 50 weight percent; and said cream layer is separated as the product of the process.

References Cited by the Examiner
UNITED STATES PATENTS

| | | | |
|---|---|---|---|
| 2,615,009 | 10/1952 | St. John et al. | 260—29.7 |
| 2,739,954 | 3/1956 | Fryling | 260—34.2 |
| 2,799,662 | 7/1957 | Ernst et al. | 260—34.2 |
| 2,923,692 | 2/1960 | Ackerman et al. | 260—78.5 |
| 2,936,295 | 5/1960 | Brodkey et al. | 260—29.7 |

FOREIGN PATENTS

| | | |
|---|---|---|
| 848,065 | 9/1960 | Great Britain. |

MURRAY TILLMAN, *Primary Examiner.*

J. ZIEGLER, *Assistant Examiner.*